(12) United States Patent
Seki et al.

(10) Patent No.: US 11,460,818 B2
(45) Date of Patent: Oct. 4, 2022

(54) EVALUATION APPARATUS, EVALUATION SYSTEM, AND EVALUATION METHOD

(71) Applicant: Yokogawa Electric Corporation, Tokyo (JP)

(72) Inventors: Tatenobu Seki, Tokyo (JP); Nobuaki Ema, Tokyo (JP); Yoshihisa Hidaka, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 185 days.

(21) Appl. No.: 16/551,725

(22) Filed: Aug. 27, 2019

(65) Prior Publication Data

US 2019/0384240 A1    Dec. 19, 2019

Related U.S. Application Data

(63) Continuation of application No. PCT/JP2018/009589, filed on Mar. 12, 2018.

(30) Foreign Application Priority Data

Mar. 13, 2017 (JP) .............................. JP2017-047796

(51) Int. Cl.
    *G05B 13/04* (2006.01)
    *G05B 19/042* (2006.01)
    *G05B 19/418* (2006.01)

(52) U.S. Cl.
    CPC ....... *G05B 13/048* (2013.01); *G05B 19/0428* (2013.01); *G05B 19/41875* (2013.01); *G05B 19/41885* (2013.01)

(58) Field of Classification Search
    CPC .............. G05B 13/048; G05B 19/0428; G05B 19/41875; G05B 19/41885;
(Continued)

(56) References Cited

U.S. PATENT DOCUMENTS 10,260,513 B2    4/2019  Higashi
2005/0240382 A1  10/2005 Nakaya
(Continued)

FOREIGN PATENT DOCUMENTS

CA        2366368 A1 *  9/2000  ......... F04D 15/0066
CN      103038714 A      4/2013
(Continued)

OTHER PUBLICATIONS

International Search Report and (ISA/237) Written Opinion of the International Search Authority for International Patent Application No. PCT/JP2018/009589, mailed by the European Patent Office dated Jul. 4, 2018.
(Continued)

*Primary Examiner* — Thomas C Lee
*Assistant Examiner* — Michael Tang

(57) ABSTRACT

An evaluation apparatus includes a storage unit that stores a model modeling a state of a facility provided in a plant, a simulator that adjusts a parameter that is set in the model so that a difference between an actual measurement value based on a process value of the facility in a first state and a first simulate value calculated by using the model is equal to or less than a threshold, and an estimation unit that estimates a first estimated operating point that indicates an operation state of the facility in the first state based on the adjusted parameter.

9 Claims, 11 Drawing Sheets

(58) Field of Classification Search
CPC ...... G05B 23/0294; G05B 2219/37214; G05B 23/0254; G05B 17/02; G05B 13/042; G05B 2219/31336; G05B 2219/3201; Y02P 90/02; Y02P 90/30; G06Q 50/04
See application file for complete search history.

(56) References Cited

U.S. PATENT DOCUMENTS

| | | | |
|---|---|---|---|
| 2006/0200325 A1* | 9/2006 | Hayashi | F22B 35/18 |
| | | | 703/2 |
| 2007/0043539 A1 | 2/2007 | Niina | |
| 2012/0001582 A1 | 1/2012 | Park | |
| 2013/0116802 A1 | 5/2013 | Friman | |
| 2015/0149136 A1 | 5/2015 | Tervo | |
| 2016/0123341 A1* | 5/2016 | Higashi | F04D 27/001 |
| | | | 415/1 |
| 2016/0363913 A1 | 12/2016 | Pfeiffer | |
| 2017/0356346 A1* | 12/2017 | Jiang | F04D 27/0292 |

FOREIGN PATENT DOCUMENTS

| | | | |
|---|---|---|---|
| CN | 103499506 A | * | 1/2014 |
| CN | 103839554 A | | 6/2014 |
| CN | 104507792 A | | 4/2015 |
| JP | S63131834 A | | 6/1988 |
| JP | H09138703 A | | 5/1997 |
| JP | 2002155708 A | * | 5/2002 |
| JP | 2002155708 A | | 5/2002 |
| JP | 2009163507 A | * | 7/2009 |
| JP | 2009163507 A | | 7/2009 |
| JP | 2015010506 A | | 1/2015 |

OTHER PUBLICATIONS

International Preliminary Report on Patentability for International Application No. PCT/JP2018/009589, completed by the European Patent Office dated Feb. 7, 2019.

Office Action issued for counterpart Japanese Application No. 2017-047796, issued by the Japan Patent Office dated Mar. 17, 2020 (drafted on Mar. 12, 2020).

Office Action issued for counterpart Japanese Application No. 2017-047796, issued by the Japan Patent Office dated Aug. 4, 2020 (drafted on Jul. 27, 2020).

Notice of First Office Action for Patent Application No. 201880017343.5, issued by The National Intellectual Property Administration of the People's Republic of China dated Dec. 20, 2021.

* cited by examiner

US 11,460,818 B2

EVALUATION APPARATUS, EVALUATION SYSTEM, AND EVALUATION METHOD

CROSS REFERENCE TO RELATED APPLICATION

This is a continuation application of International Application No. PCT/JP2018/009589, filed on Mar. 12, 2018, which claims priority to Japanese Patent Application No. 2017-047796, filed on Mar. 13, 2017, the contents of each of which are incorporated herein by reference.

BACKGROUND

1. Technical Field

The present invention relates to an evaluation apparatus, an evaluation system, and an evaluation method.

2. Related Art

A process plant includes facilities that achieve predetermined functions, such as a tank, a pipe, a pump, a compressor, and a heat exchanger, and a process control system that measures or controls states of these facilities and states of a raw material, gas, cooling water and the like which flow in these facilities. In the process control system, an estimation of a cause of abnormality in the process, a prediction of an operation of the plant, and the like may also be performed by using a simulation result obtained by simulating a behavior of the plant by a simulator.

To create a model using the above-described simulation, design values or experimental values (hereinafter, referred to as "value(s) provided by a manufacturer") are often utilized, which are provided by a manufacturer, such as a manufacturer of a facility provided in a plant, and indicate a performance of the facility. However, these values provided by the manufacturer are often collected under a condition that is different from a use condition in an actual plant.

For example, a centrifugal compressor often operates combustible gas with high pressure at a large flow volume under the use condition in the actual plant, and a required power for that may also be at least tens of thousands of KW and be hundreds of thousands of KW in some cases. For this reason, in a case where the manufacturer of the centrifugal compressor collects the values provided by the manufacturer, it is not easy for the manufacturer to execute a performance test under the same condition as the use condition in the actual plant. Also, because many performance tests executed by the manufacturers are executed by using test gas (for example, incombustible gas) selected so that the condition is close to the use condition in the actual plant, the performance under the use condition in the actual plant, also including an initial performance, is not grasped, in many cases.
[Patent document 1] Japanese Patent Application Publication No. 2014-043795

SUMMARY

In order to grasp the performance of the facility under the use condition in the actual plant, a method of detecting, by installing various sensors, such as vibration sensors, in the target facility, the abnormality and the like of the facility based on detection values of the sensors, and the like have been performed. However, in the case of this method, when the abnormality of the facility is detected successfully, deterioration of the facility has already significantly progressed in many cases.

On the other hand, if the simulation is performed by using a model created based on the value provided by the manufacturer as described above, accuracy of the simulation is lowered and the performance of the facility cannot be properly evaluated in some cases. In particular, if a difference between the value provided by the manufacturer and a performance value under the use condition in the actual plant is large, the accuracy of the simulation may be significantly lowered.

The present invention is taking the above-described issues into consideration, and is to provide an evaluation apparatus, an evaluation system, and an evaluation method which are capable of evaluating, with high accuracy, an operation state of a facility under a use condition in an actual plant and capable of early detecting the abnormality and the like of the facility. According to the present invention, because the abnormality of the facility can be caught at its sign stage, the abnormality of the apparatus can be detected earlier than the conventional method using a measuring instrument such as a sensor.

Here, one aspect of technological innovation included in the present specification is to provide an evaluation apparatus, an evaluation system, and an evaluation method which can resolve the above-described issues.

The evaluation apparatus may include a storage unit that stores a model modeling a state of a facility provided in a plant. The evaluation apparatus may include a simulator to adjust a parameter that is set in the model so that a difference between an actual measurement value based on a process value of a facility in a first state and a first simulate value calculated by using the model is equal to or less than a threshold. The evaluation apparatus may include an estimation unit that estimates a first estimated operating point that indicates an operation state of the facility in the first state based on the adjusted parameter.

Note that the summary clause of the above-described invention does not necessarily describe all necessary features of the embodiments of the present invention. The present invention may also be a sub-combination of these feature groups described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
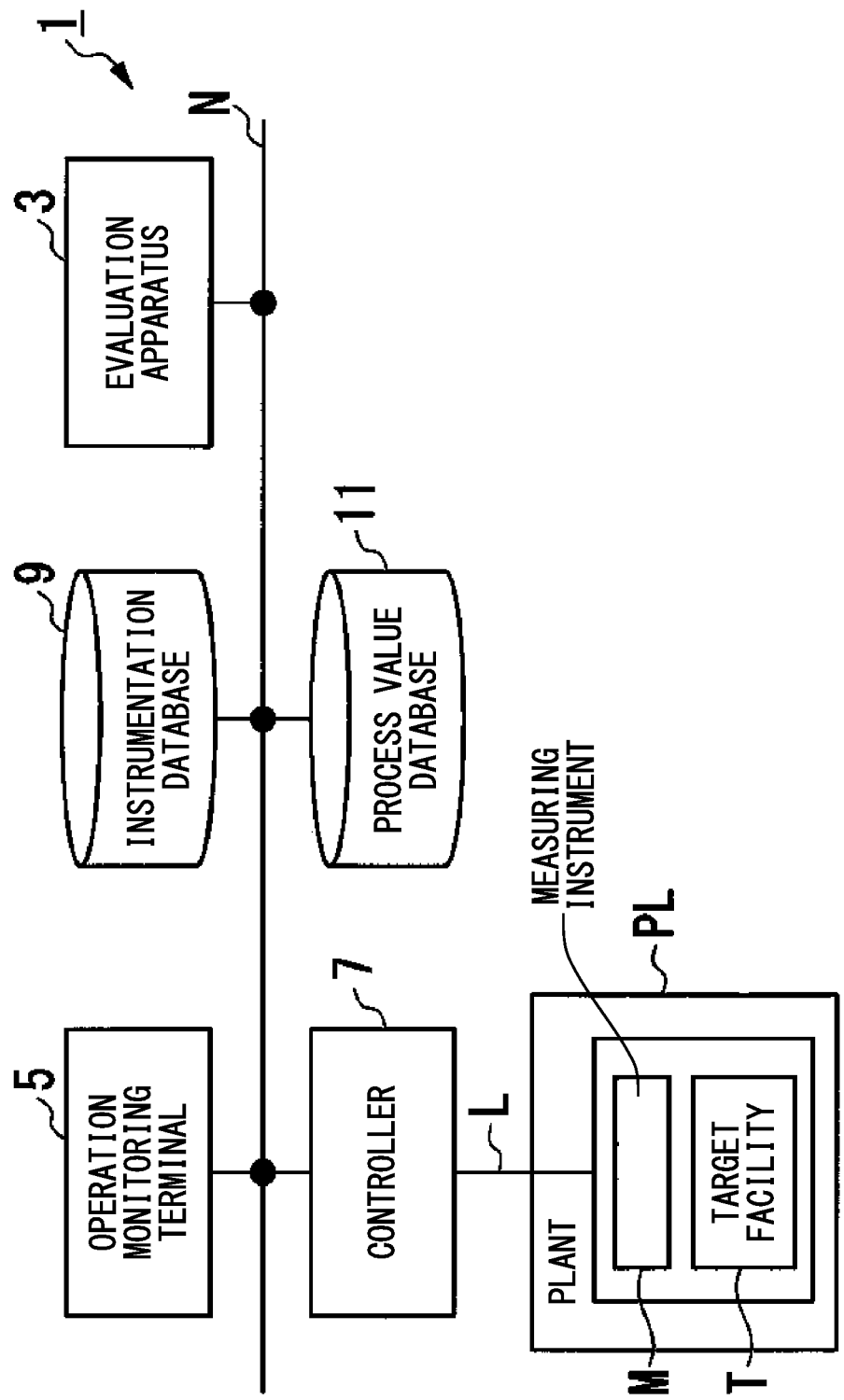
FIG. 1 is a block diagram showing one example of an evaluation system in the present embodiment.

FIG. 1 is a block diagram showing one example of an evaluation system 1 in the present embodiment. The evaluation system 1 includes, for example, an evaluation apparatus 3, an operation monitoring terminal 5 (a control system), a controller 7 (a control system), an instrumentation database 9 (a database), and a process value database 11 (a database). The evaluation apparatus 3, the operation monitoring terminal 5, the controller 7, the instrumentation database 9, and the process value database 11 are connected to each other via a control network N, for example.

The evaluation apparatus 3 evaluates each facility (a target facility T) provided in a plant PL. The evaluation apparatus 3 adjusts a parameter, that is set in a model using a simulation, by comparing the process value (an actual measurement value) obtained from the target facility T via a measuring instrument M with a simulate value obtained by the simulation. Also, the evaluation apparatus 3 evaluates each facility provided in the plant PL; for example, the evaluation apparatus 3 performs an estimation of performance deterioration. The evaluation apparatus 3 is described below in detail.

The plant PL is, for example, in addition to a plant for an industry such as petroleum or chemical industry, a plant for managing and controlling a well source, such as a gas field or an oil field, or the periphery of the well source, a plant for managing and controlling power generation such as hydraulic power, thermal power, and nuclear power, a plant for managing and controlling environmental power generation such as solar power or wind power, a plant for managing and controlling water and sewerage, a dam or the like, and the like.

The target facility T is, for example, a compressor that pressure-feeds various gas fluids, a pump that delivers various liquid fluids, a heat exchanger that exchanges heat between various fluids, a valve, an evaporator, a reactor, and a distillation tower. Also, the target facility T may also be any facility that is a facility for which it is possible to evaluate the facility by selecting and adjusting a model parameter that has a high sensitivity to the actual measurement value.

Also, the plant PL is provided with a measuring instrument M that is for measuring a process value of a fluid input in the target facility T and the like and a process value of a fluid output from the same facility and the like. This measuring instrument M is, for example, a pressure gauge that measures a pressure of a fluid input in and output from the target facility T, a thermometer that measures a temperature of the fluid, a flow rate meter that measures a flow rate of the fluid, and the like. Note that if the target facility T has a function of measuring the process value, the measuring instrument M may not be provided.

The target facility T and the measuring instrument M are connected to the controller 7 via a transmission line L. The measuring instrument M sends a signal such as a measured process value to the controller 7 via the transmission line L. Note that although one target facility T and one measuring instrument M are shown in FIG. 1, two or more target facilities T and two or more measuring instruments M may also be installed in the plant PL.

The operation monitoring terminal 5 is, for example, a terminal that is operated by an operator of the plant and is used to monitor the process. For example, the operation monitoring terminal 5 acquires, from the controller 7, data (for example, the process value) sent from the target facility T or the measuring instrument M, notifies the operator of the behavior of the target facility T or the measuring instrument M, and controls the controller 7 based on an instruction of the operator.

The controller 7 performs controlling by performing a process control communication with the target facility T or the measuring instrument M in response to the instruction and the like from the operation monitoring terminal 5. For example, the controller 7 acquires the process value measured by the target facility T or the measuring instrument M. Also, the controller 7 stores, in the process value database 11, the process value obtained by performing the process control communication with the target facility T or the measuring instrument M.

The instrumentation database 9 stores a setting condition and the like of the facility/measuring instrument/control system (the controller, the operation monitoring terminal) and the like provided in the plant PL. In life cycle of the plant for a long period of time, the facility may be exchanged or added, and a control program may be modified. The instrumentation database 9 also stores these change history information and the like.

The process value database 11 stores the data sent from the target facility T or the measuring instrument M, or the data (for example, the process value, the operation amount, the operation condition, and the like) sent to the target facility T. Note that the instrumentation database 9 and the process value database 11 may also be constructed in a memory that is provided within the controller 7. Otherwise, the instrumentation database 9 and the process value database 11 may also be constructed in a memory that is provided within the evaluation apparatus 3.

The control network N is a wired network such as Ethernet (registered trademark), for example; however, the control network N may also be a wireless network that can perform wireless communication in compliance with wireless communication standard such as Wi-Fi (registered trademark), WiMAX (registered trademark), and 3G/LTE (registered trademark), for example.

Figure 2:
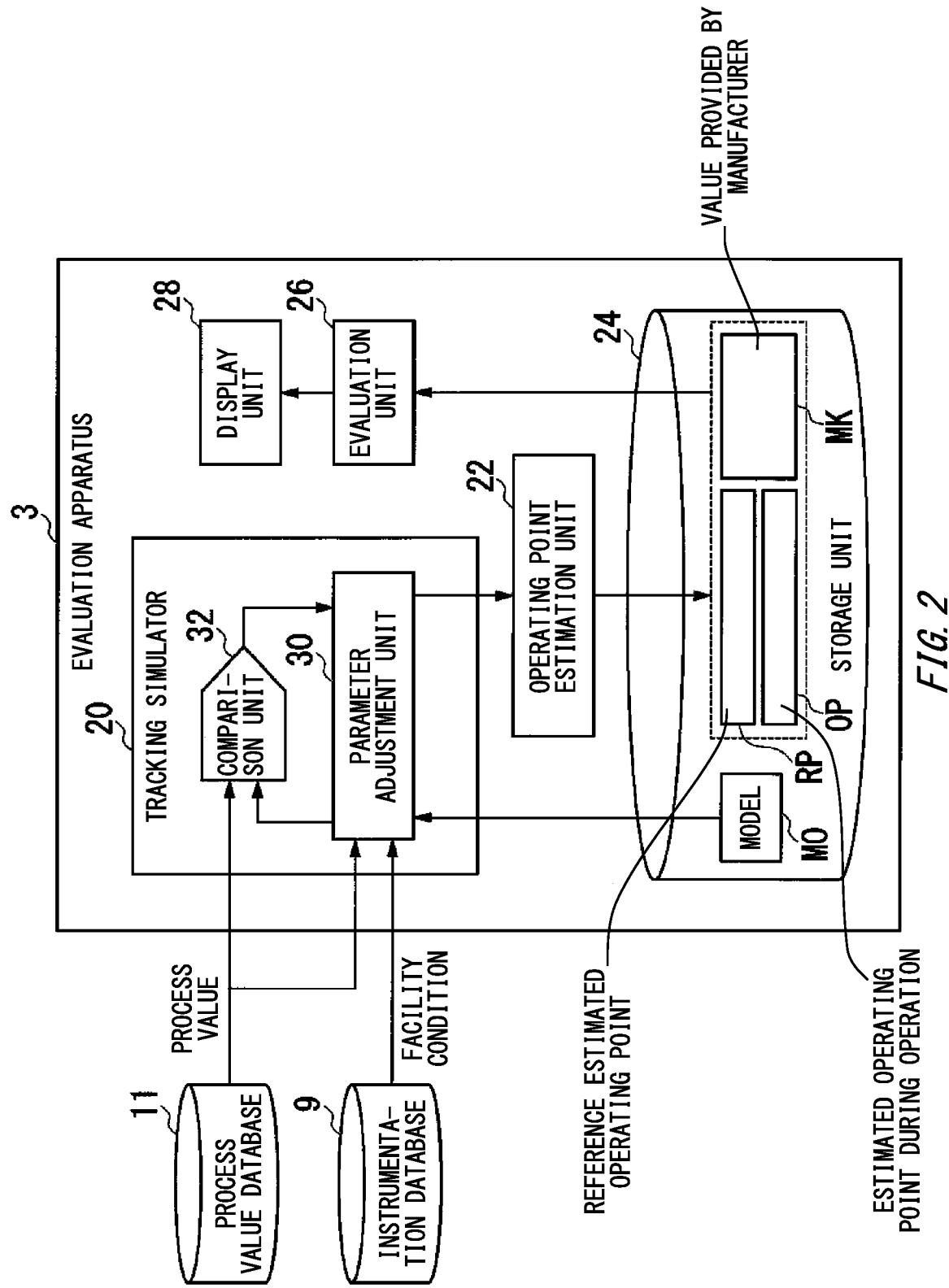
FIG. 2 is a block diagram showing one example of an evaluation apparatus in the present embodiment.

FIG. 2 is a block diagram showing one example of the evaluation apparatus 3 in the present embodiment. The evaluation apparatus 3 includes, for example, a tracking simulator 20 (a simulator), an operating point estimation unit 22 (an estimation unit), a storage unit 24, an evaluation unit 26, and a display unit 28. The tracking simulator 20, the operating point estimation unit 22, and the evaluation unit 26 may be achieved by executing, by a processor such as a CPU (Central Processing Unit), a program stored in a program memory not shown in the drawing, for example.

The tracking simulator 20 tracks the actual plant on-line in real time and simulates a state of the plant. Because the tracking simulator 20 uses the model based on physical or chemical rules, the tracking simulator 20 can calculate not only simply superficial actions, such as the input and output to/from the process, but also a detailed state of the inside of the process. For that reason, the deterioration and the like of the inside of the plant are also reflected in the parameter of the simulation. For example, the tracking simulator 20 has functions of reading various data, such as the process value, from the process value database 11 and simulating the operation state of each facility provided in the plant PL, and adjusting a model MO used for the simulation to match with the actual operation of the plant PL by comparing a simulation result with actual data such as the process value.

The model MO is modeling the state of each facility provided in the plant PL. The model MO is created based on a P & ID (Piping and Instruments Diagram) and the like when designing the plant. The model MO is expressed by a simultaneous equation indicating a relation among various parameters included in the input, the output, external factors, and the facility being the modeling target. For example, the tracking simulator 20 performs the above-described tracking simulation by adjusting the parameters that are set in the model MO.

The tracking simulator 20 includes a parameter adjustment unit 30 and a comparison unit 32, for example. The parameter adjustment unit 30 performs the tracking simulation by using the model MO read from the storage unit 24. The comparison unit 32 compares the process value acquired from the process value database 11 or an index value that is calculated by using the process value and that indicates the performance of the facility, with a simulate value calculated by using the model MO, by the parameter adjustment unit 30, and outputs the comparison result to the parameter adjustment unit 30. It may be determined to use either the process value or the index value according to the type of the target facility T and the like. For example, if the target facility T is a compressor, an outlet flow rate and a differential pressure between the suction pressure and the discharge pressure, or the outlet flow rate and a ratio of the suction pressure to the discharge pressure are used as the index value calculated by using the process value.

The parameter adjustment unit 30 adjusts the parameter included in the model MO based on the comparison result input from the comparison unit 32 to perform a process of matching (tracking simulation) with the actual operation of the plant PL. For example, the tracking simulator 20 adjusts the parameter so that a difference between the actual measurement value based on the process value of the facility and the simulate value calculated by using the model MO is equal to or less than a predetermined threshold.

The operating point estimation unit 22 associates the adjusted parameter input from the parameter adjustment unit 30 with the process value at that time point, estimates an estimated operating point that indicates an operation in the estimated performance of the facility, and stores the estimated operating point in the storage unit 24.

The storage unit 24 stores the model MO utilized in the simulation of the tracking simulator 20, the estimated operating points (the reference estimated operating point RP, the estimated operating point OP during operation), the value provided by the manufacturer MK that indicates the performance of the facility, and the like. The storage unit 24 is configured with, for example, a HDD (Hard Disc Drive), a SSD (Solid State Drive), a memory, and the like.

The evaluation unit 26 evaluates the state of each facility provided in the plant PL by comparing the value provided by the manufacturer with the simulate value of the parameter adjusted in the simulation, or by comparing the simulate value of the parameter adjusted in the past simulation with the simulate value of the parameter adjusted in the current simulation. The evaluation unit 26 may also output the evaluation result of each facility to the display unit 28.

The display unit 28 displays the evaluation result of each facility input from the evaluation unit 26. The display unit 28 is a liquid crystal display, an organic EL (Electroluminescence) display apparatus or the like.

(Reference Performance Evaluation)

Figure 3:
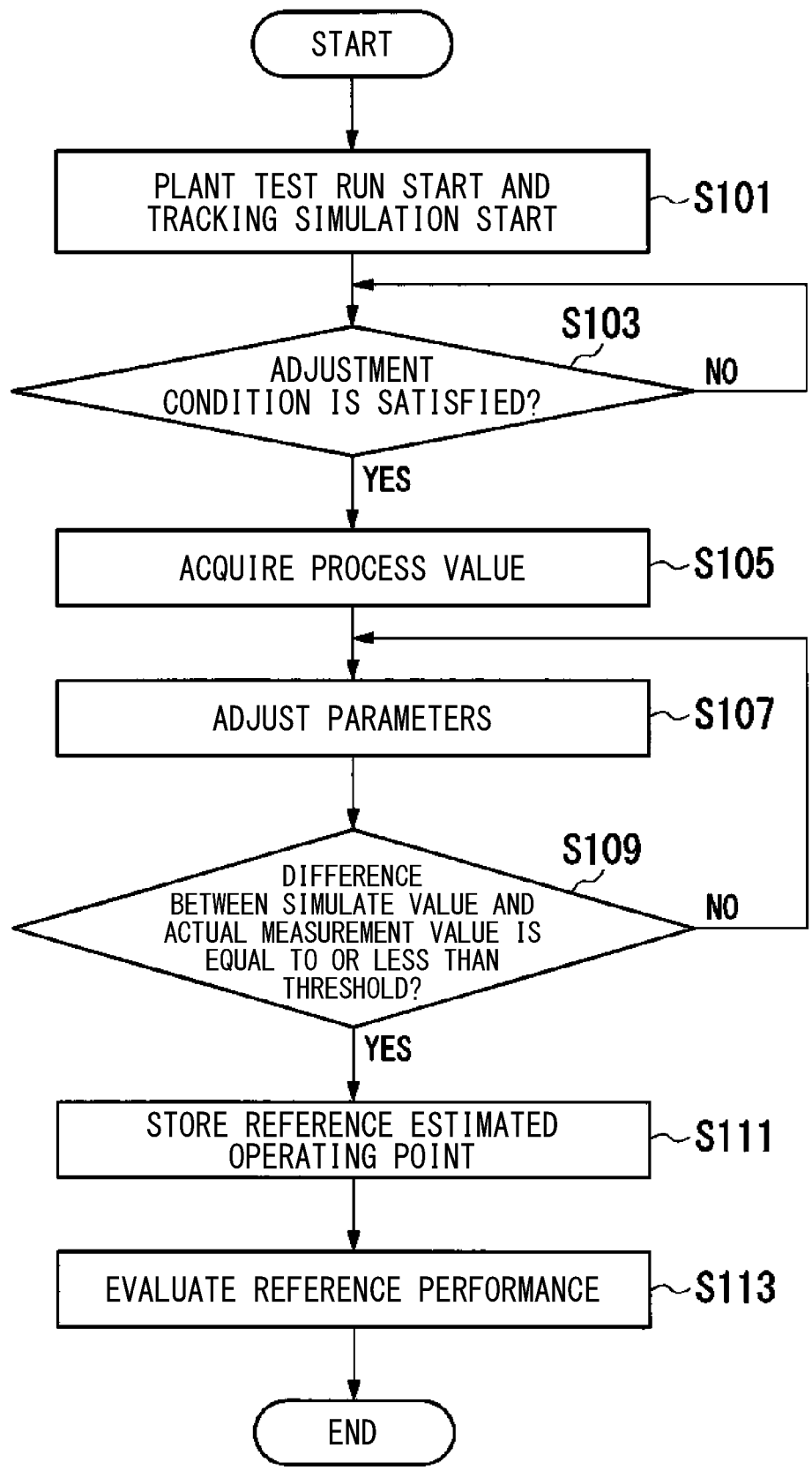
FIG. 3 is a flow chart showing one example of a reference performance evaluation process of the evaluation apparatus in the present embodiment.

Next, the operation of the evaluation apparatus 3 of the present embodiment is described. FIG. 3 is a flow chart showing one example of the reference performance evaluation process of the evaluation apparatus 3 in the present embodiment. The reference performance is a performance being the reference when evaluating the performance of the facility under the use condition in the actual plant. The reference performance is acquired in a reference state (a first state) that is optionally set according to the purpose, for example, during introduction of the target facility T, at start-up after a periodic repair, others, any time point under operation of the target facility T (the plant PL), and the like.

First, for example, when carrying out a test run during introduction of the plant PL, the test run of the plant PL starts based on the operation and the like of the operation monitoring terminal 5 by an operator of the plant to start the tracking simulation in the evaluation apparatus 3 (Step S101).

Next, the parameter adjustment unit 30 determines whether or not the process value related to the target facility T acquired from the process value database 11 satisfies the adjustment condition of the parameter (Step S103). That is, the parameter adjustment unit 30 determines whether or not the state is that the process value related to the target facility T is stable and the reference performance of the target facility T can be properly evaluated. For example, the parameter adjustment unit 30 determines that the adjustment condition of the parameter is satisfied if a variation range of the process value related to the target facility T is equal to or less than a predetermined threshold (or, the variation range may also be smaller than the predetermined threshold), and determines that the adjustment condition of the parameter is not satisfied if the variation range is larger than the predetermined threshold (or, the variation range may also be equal to or more than the predetermined threshold). The parameter adjustment unit 30 continues performing the above-described determining process by using the process value if it is determined that the adjustment condition is not satisfied.

On the other hand, if the parameter adjustment unit 30 determines that the process value related to the target facility T satisfies the adjustment condition of the parameter, the parameter adjustment unit 30 acquires the process value used for the tracking simulation from the process value database 11 (Step S105), and uses this acquired process value or an index value calculated by using this acquired process value (the "process value" and the "index value calculated by using the process value" are collectively referred to as an "actual measurement value") to adjust the parameter of the target facility T, the parameter set in the model MO read from the storage unit 24 (Step S107). For example, the parameter adjustment unit 30 adjusts the parameter of the target facility T that is set in the model MO so that the simulate value (the first simulate value) calculated by the above-described tracking simulation and the acquired process value or index value become equal to each other. It may be determined to use either the process value or the index value according to the type of the target facility T and the like.

Next, the parameter adjustment unit 30 outputs the simulate value to the comparison unit 32. Also, when performing the simulation using the index value, the parameter adjustment unit 30 also outputs this index value to the comparison unit 32. The comparison unit 32 compares the simulate value input from the parameter adjustment unit 30 with the process value acquired from the process value database 11 or the index value input from the parameter adjustment unit 30, and outputs the comparison result to the parameter adjustment unit 30. The parameter adjustment unit 30 refers to this comparison result to determine whether or not the difference between the simulate value and the process value or the index value is equal to or less than the predetermined threshold (Step S109). If the parameter adjustment unit 30 determines that the difference between the simulate value and the process value or the index value is not equal to or less than the predetermined threshold, the parameter adjustment unit 30 adjusts the parameter again. Note that the parameter adjustment unit 30 may also repeat the parameter adjustment until the simulate value and the process value or the index value are matched with each other.

On the other hand, if the parameter adjustment unit 30 determines that the difference between the simulate value and the process value or the index value is equal to or less than the predetermined threshold, the parameter adjustment unit 30 outputs the adjusted parameter to the operating point estimation unit 22 along with the process value at that time point, the time stamp (time) when the process value is measured, and the like. Note that the parameter adjustment unit 30 may also output other environmental conditions and the like to the operating point estimation unit 22. The operating point estimation unit 22 estimates the reference estimated operating point RP (a first estimated operating point) associating the adjusted parameter input from the parameter adjustment unit 30, the process value, the time stamp and the like with each other, and stores the reference estimated operating point RP in the storage unit 24 (Step S111). The reference estimated operating point RP indicates an operating point of the target facility T in a reference state. Note that the parameter adjustment unit 30 may also store the reference estimated operating point RP in the storage unit 24.

Next, the evaluation unit 26 reads the reference estimated operating point RP and the value provided by the manufacturer MK from the storage unit 24, and performs the reference performance evaluation of the target facility T by comparing both of the reference estimated operating point RP and the value provided by the manufacturer MK with each other (Step S113). For example, the evaluation unit 26 evaluates the performance of the target facility T in the reference state based on the difference between the value provided by the manufacturer MK (the data that indicates the performance of the target facility T provided by the manufacturer) and the data that indicates the estimated performance of the target facility T at the reference estimated operating point RP. The evaluation unit 26 may also display the evaluation result in the display unit 28. According to the above, the process in the present flow chart is completed.

(Performance Evaluation During Operation)

Figure 4:
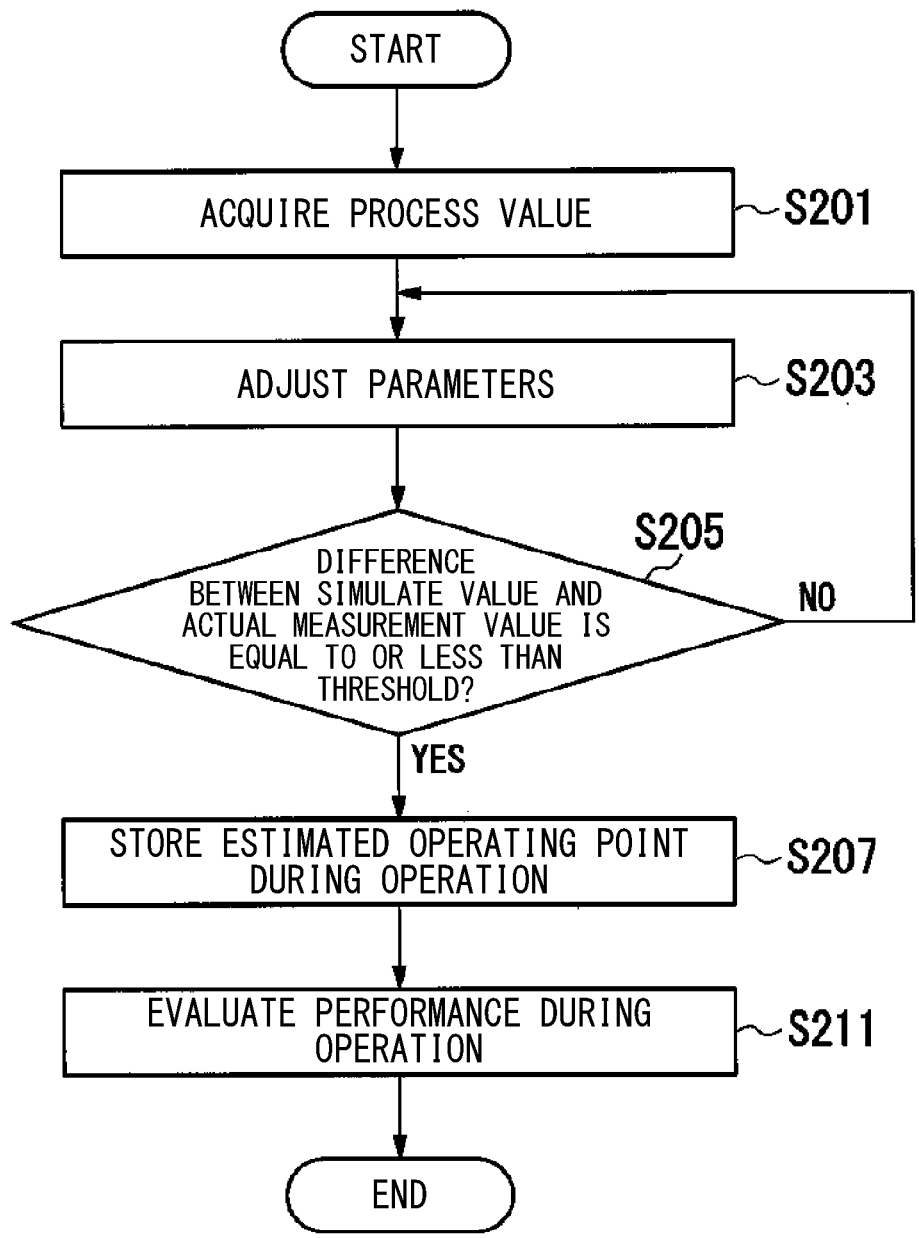
FIG. 4 is a flow chart showing one example of a performance evaluation process during operation of the evaluation apparatus in the present embodiment.

Next, the performance evaluation process during operation of the evaluation apparatus 3 of the present embodiment is described. FIG. 4 is a flow chart showing one example of the performance evaluation process during operation of the evaluation apparatus 3 in the present embodiment. The performance during operation is a performance of the target facility T during operation. The performance during operation is acquired in a state during operation (a second state) that is optionally set according to the purpose, for example, at any time point under operation and the like. This second state indicates a state temporally posterior to the above-described first state.

For example, at the evaluation starting time point of the target facility T during operation of the plant PL, the parameter adjustment unit 30 acquires the process value used for the tracking simulation from the process value database 11 (Step S201).

Next, the parameter adjustment unit 30 uses the acquired process value or the index value calculated by using this acquired process value to adjust the parameter of the target facility T that is set in the model MO (Step S203). For example, the parameter adjustment unit 30 adjusts the parameter of the target facility T that is set in the model MO so that the simulate value (a second simulate value) calculated by the tracking simulation and the process value or the index value become equal to each other. It may be determined to use either the process value or the index value according to the type of the target facility T and the like.

Next, the parameter adjustment unit 30 outputs the simulate value calculated by the simulation to the comparison unit 32. Also, when performing the simulation using the index value, the parameter adjustment unit 30 also outputs this index value to the comparison unit 32. The comparison unit 32 compares the simulate value input from the parameter adjustment unit 30 with the process value acquired from the process value database 11 or the index value input from the parameter adjustment unit 30, and outputs the comparison result to the parameter adjustment unit 30. The parameter adjustment unit 30 refers to this comparison result to determine whether or not the difference between the simulate value and the process value or the index value is equal to or less than the predetermined threshold (Step S205). If the parameter adjustment unit 30 determines that the difference between the simulate value and the process value or the index value is not equal to or less than the predetermined threshold, the parameter adjustment unit 30 adjusts the parameter again. Note that the parameter adjustment unit 30 may also repeat the parameter adjustment until the simulate value and the process value or the index value are matched with each other.

On the other hand, if the parameter adjustment unit 30 determines that the difference between the simulate value and the process value or the index value is equal to or less than the predetermined threshold, the parameter adjustment unit 30 outputs the adjusted parameter to the operating point estimation unit 22 along with the process value at that time point, the time stamp, and the like. Note that the parameter adjustment unit 30 may also output other environmental conditions and the like to the operating point estimation unit 22. The operating point estimation unit 22 estimates the estimated operating point OP during operation (a second estimated operating point) associating the adjusted parameter input from the parameter adjustment unit 30, the process value, the time stamp and the like with each other, and stores the estimated operating point OP during operation to the storage unit 24 (Step S207). The estimated operating point OP during operation indicates the operating point of the target facility T in the state during operation. Note that the parameter adjustment unit 30 may also store the estimated operating point OP during operation in the storage unit 24.

Next, the evaluation unit 26 reads, from the storage unit 24, the reference estimated operating point RP obtained in the above-described reference performance evaluation process, and the estimated operating point OP during operation, and performs the performance evaluation during operation of the target facility T by comparing both of the reference estimated operating point RP and the estimated operating point OP during operation with each other (Step S211). For example, the evaluation unit 26 evaluates the change of the operation of the target facility T based on the difference between the reference estimated operating point RP (the data that indicates the performance of the target facility T in the reference state) and the data that indicates the estimated performance of the target facility T at the estimated operating point OP during operation. The evaluation unit 26 may also display the evaluation result on the display unit 28. According to the above, the process of the present flow chart is completed. Also, the evaluation unit 26 may also calculate the difference (a deviation amount) between the reference estimated operating point RP and the estimated operating point OP during operation without displaying the evaluation result on the screen, and if this deviation amount exceeds a preset threshold, the evaluation unit 26 may also notify the worker of this. Note that in addition to the reference estimated operating point RP and the estimated operating point OP during operation, the evaluation unit 26 may also read the value provided by the manufacturer MK from the storage unit 24, and perform the performance evaluation during operation of the target facility T by comparing these with each other.

According to the present embodiment described above, the operation state of the facility under the use condition in the actual plant can be evaluated with high accuracy, and it is possible to early detect the abnormality and the like of the facility. According to the present embodiment, for example, because the abnormality of the facility can be caught in its sign stage, the abnormality of the apparatus can be detected earlier than by the conventional method that uses the measuring instrument such as a sensor. Also, for the facility under the use condition in the actual plant, the difference from the value provided by the manufacturer can be grasped by obtaining the reference estimated operating point. Also, even if the difference between the measurement condition of the value provided by the manufacturer of the facility and the use condition in the actual plant is large, a mistaken adjustment of the parameter at the time of simulation can be prevented and a simulation with high accuracy can be performed. Also, it is possible to provide a model with higher accuracy when making a periodic repair, a modification, and the like of the plant, and the same model can be utilized over the life cycle of the plant for a long period.

Also, by storing the reference estimated operating point, appropriately implementing the simulation under operation or during maintenance, and obtaining the estimated operating point during operation at that time point, a change state (a deterioration status) of the situation of the facility can be grasped (diagnosed). Also, from a steep change of the estimated operating point, a change and the like of a viscosity/material of gas/liquid passing through the facility can also be found.

Next, an example that the evaluation apparatus of the present embodiment evaluates the performance of the "compressor" as the target facility T is described. For this reason, in a description of an embodiment that is to be described next, the same reference signs as those of the above-described embodiment are given to portions similar to those of the above-described embodiment, and the descriptions thereof are omitted or simplified.

Figure 5:
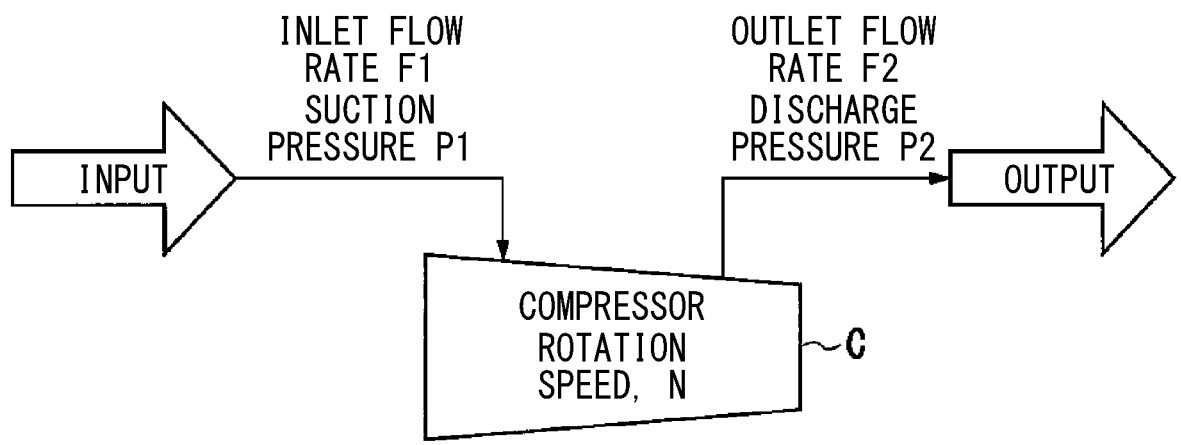
FIG. 5 is a schematic view of a compressor in the present embodiment.

FIG. 5 is a schematic view of a compressor C in the present embodiment. The compressor C is, for example, a centrifugal compressor that compresses sucked gas by a pressure converted from a speed energy given by a centrifugal force of an impeller (a vane wheel) rotating relative to the gas. The compressor C sucks gas at an inlet flow rate F1 and at a suction pressure P1, and pressure-feeds gas at an outlet flow rate F2 and at a discharge pressure P2 by using the impeller having a rotation speed, N. Because usually a controller for the flow rate is provided behind an outlet of the compressor C, the outlet flow rate F2 is controlled.

Figure 6:
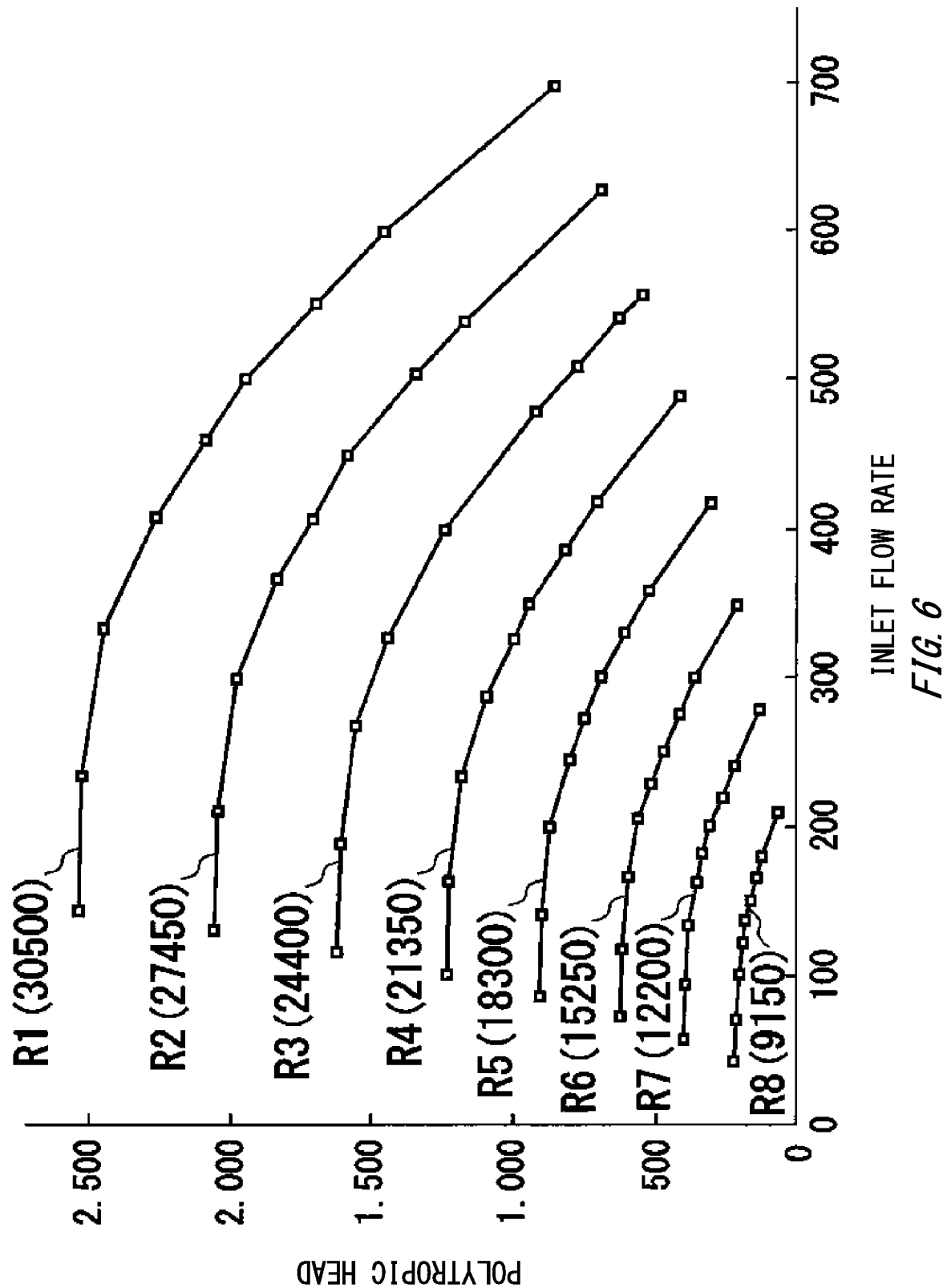
FIG. 6 is a drawing showing one example of a performance curve (value provided by the manufacturer) that indicates a performance of the compressor in the present embodiment.

FIG. 6 is a drawing showing one example of a performance curve (the value provided by the manufacturer) that indicates the performance of the compressor C in the present embodiment. In FIG. 6, the vertical axis indicates a head (a pump head, a hydraulic head) in a polytropic state (hereinafter, referred to as "polytropic head"), which is one of the specifications indicating the performance of the compressor and the like (refer to Patent document 1), and the horizontal axis indicates the inlet flow rate. If the outlet flow rate and the differential pressure between and the suction pressure and the discharge pressure, or the outlet flow rate and the ratio of the suction pressure to the discharge pressure are constant values, the inlet flow rate on the horizontal axis is uniquely determined. Note that numerical values in parentheses given to each of curves R1 to R8 indicate the numbers of rotations of the compressor C. It is found that as the rotation speed of the compressor C is reduced from R1 to R8, the polytropic head is reduced.

Under a general use condition, the rotation speed of the compressor C has a positive correlation with the differential pressure between the suction pressure and the discharge pressure of the compressor (or the ratio of the suction pressure to the discharge pressure of the compressor). Therefore, for the differential pressure, as a result of adjusting a setting value of the rotation speed in the simulator so that the actual measurement value and the simulate value match with each other, it can also be said that a difference occurs between the actual performance of the facility under the use condition in the actual plant and the value provided by the manufacturer if a difference between the rotation speed obtained by the simulation and the rotation speed under the use condition in the actual plant occurs. In the present embodiment, the simulation is performed by using the differential pressure between the suction pressure P1 and discharge pressure P2 which are obtained by the actual measurement, or the ratio of the suction pressure P1 to the discharge pressure P2.

(Reference Performance Evaluation)

Figure 7:
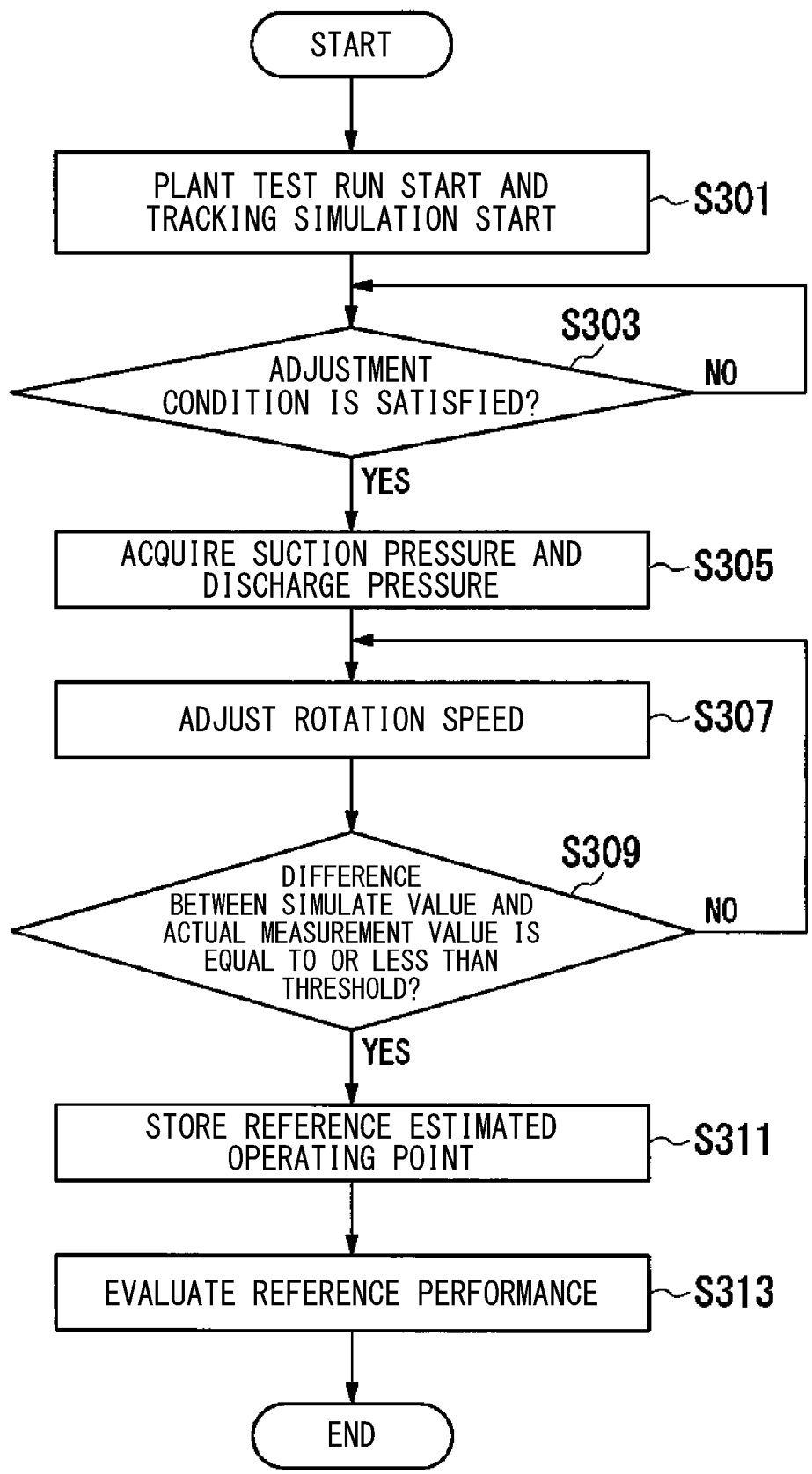
FIG. 7 is a flow chart showing one example of a reference performance evaluation process of the evaluation apparatus in the present embodiment.

Next, the operation of the evaluation apparatus 3 in the present embodiment is described. FIG. 7 is a flow chart showing one example of the reference performance evaluation process of the evaluation apparatus 3 in the present embodiment.

First, for example, when carrying out a test run of the plant PL during introduction, the test run of the plant PL starts based on the operation and the like of the operation monitoring terminal 5 by an operator of the plant to start the tracking simulation in the evaluation apparatus 3 (Step S301).

Next, the parameter adjustment unit 30 determines whether or not the process value related to the compressor C that is the target facility T, the process value acquired from the process value database 11, satisfies the adjustment condition of the parameter (Step S303). For example, the parameter adjustment unit 30 determines whether or not the state is that the inlet flow rate F1, the suction pressure P1, the outlet flow rate F2, and the discharge pressure P2 are stable and the reference performance of the compressor C can be properly evaluated. For example, the parameter adjustment unit 30 determines that the adjustment condition of the parameter is satisfied if the variation range of the inlet flow rate F1 is equal to or less than a predetermined threshold (or the variation range may also be smaller than the predetermined threshold), and determines that the adjustment condition of the parameter is not satisfied if the variation range is larger than the predetermined threshold (or the variation range may also be equal to or more than the predetermined threshold). The parameter adjustment unit 30 continues the above-described determining process using the inlet flow rate F1 if it is determined that the adjustment condition is not satisfied.

On the other hand, if the parameter adjustment unit 30 determines that the process value related to the compressor C satisfies the adjustment condition of the parameter, the parameter adjustment unit 30 acquires the suction pressure P1 and the discharge pressure P2 used for the tracking simulation from the process value database 11, and calculates the differential pressure between these acquired suction pressure P1 and discharge pressure P2 (Step S305). Note that the parameter adjustment unit 30 may be also set to calculate the ratio of the suction pressure P1 to the discharge pressure P2 instead of the differential pressure between the suction pressure P1 and the discharge pressure P2. In the followings, an example using the differential pressure between the suction pressure P1 and the discharge pressure P2 is described.

Next, the parameter adjustment unit 30 uses the differential pressure between the suction pressure P1 and the discharge pressure P2 to adjust the "rotation speed" being the parameter of the compressor C that is set in the model MO read from the storage unit 24 (Step S307). For example, the parameter adjustment unit 30 adjusts the "rotation speed" of the compressor C so that the simulate value, calculated by the tracking simulation, of the differential pressure between the suction pressure P1 and the discharge pressure P2 becomes equal to the actual measurement value, acquired from the process value database 11, of the differential pressure between the suction pressure P1 and the discharge pressure P2.

Next, the parameter adjustment unit 30 outputs, to the comparison unit 32, the simulate value, calculated by the simulation, of the differential pressure between the suction pressure P1 and the discharge pressure P2 and the actual measurement value, acquired from the process value database 11, of the differential pressure between the suction pressure P1 and the discharge pressure P2. The comparison unit 32 compares the simulate value with the actual measurement value, and outputs the comparison result to the parameter adjustment unit 30. The parameter adjustment unit 30 refers to this comparison result, and determines whether or not the difference between the simulate value and the actual measurement value is equal to or less than the predetermined threshold (Step S309). If the parameter adjustment unit 30 determines that the difference between the simulate value and the actual measurement value is not equal to or less than the predetermined threshold, the parameter adjustment unit 30 adjusts the rotation speed again. Note that the parameter adjustment unit 30 may also repeat the adjustment of the rotation speed until the simulate value and the actual measurement value are matched with each other.

On the other hand, if the parameter adjustment unit 30 determines that the difference between the simulate value and the actual measurement value is equal to or less than the predetermined threshold, the parameter adjustment unit 30 outputs the adjusted rotation speed to the operating point estimation unit 22 along with the process value at that time point, the time stamp, and the like. Note that the parameter adjustment unit 30 may also output other environmental conditions and the like to the operating point estimation unit 22. The operating point estimation unit 22 estimates the reference estimated operating point RP associating the rotation speed, the process value, the time stamp, and the like with each other, which are input from the parameter adjustment unit 30, and stores the reference estimated operating point RP in the storage unit 24 (Step S311). Note that the parameter adjustment unit 30 may also store the reference estimated operating point RP in the storage unit 24.

Next, the evaluation unit 26 reads the reference estimated operating point RP and the value provided by the manufacturer MK from the storage unit 24, and performs the reference performance evaluation of the compressor C by comparing both of the reference estimated operating point RP and the value provided by the manufacturer MK with each other (Step S313). The evaluation unit 26 may also display the evaluation result on the display unit 28. According to the above, the process of the present flow chart is completed.

Figure 8:
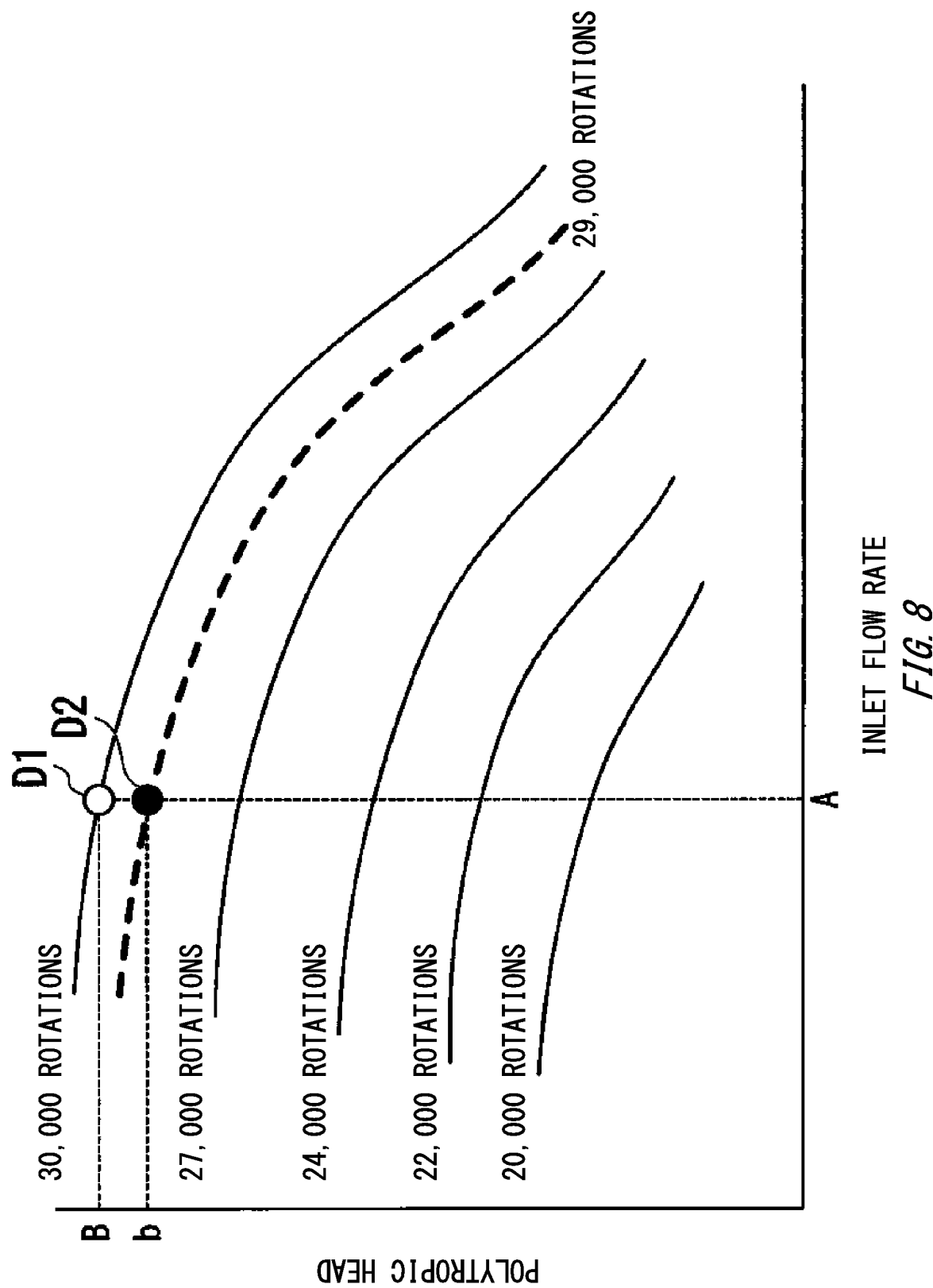
FIG. 8 is a drawing showing one example that a reference performance value under a use condition in an actual plant is mapped on the performance curve of the value provided by the manufacturer in the present embodiment.

FIG. 8 is a drawing showing one example that the reference performance value under the use condition in the actual plant PL is mapped on the performance curve of the value provided by the manufacturer MK in the present embodiment. Here, if the setting values of rotation speed for the actual facility and for the simulator are the same as each other, the actual facility is having similar performance to that of the value provided by the manufacturer MK. On the other hand, even if the setting value of the rotation speed for the simulator is lower than the setting value of the rotation speed for the actual facility, when the actual measurement value of the differential pressure and the simulate value of the differential pressure are equal to each other, only the differential pressure of the actual facility corresponding to that low rotation speed can occur.

In FIG. 8, it is shown that on the performance curve (the rotation speed: 30,000 rotations) of the value provided by the manufacturer MK, while a value of the polytropic head of D1 of the inlet flow rate A is B, a value of the polytropic head of D2 indicating the performance value under the use condition in the actual plant PL is lowered to b. The curve shown by a dotted line in FIG. 8 is obtained by performing a linear interpolation from the performance curve of the value provided by the manufacturer MK so that the value of the polytropic head obtained according to the adjustment of the tracking simulator 20 conforms to the curve. According to this, it is found that under the use condition in the actual plant PL, even if the rotation speed of the compressor C is 30,000 rotations, the value of the polytropic head is not B but b (equivalent to 29,000 rotations) that can only be obtained. Note that when identifying the reference performance, if a plurality of different inlet flow rates are set on the actual facility side and are respectively identified by the tracking simulator in advance, the reference performance can be obtained more accurately.

(Performance Evaluation During Operation)

Figure 9:
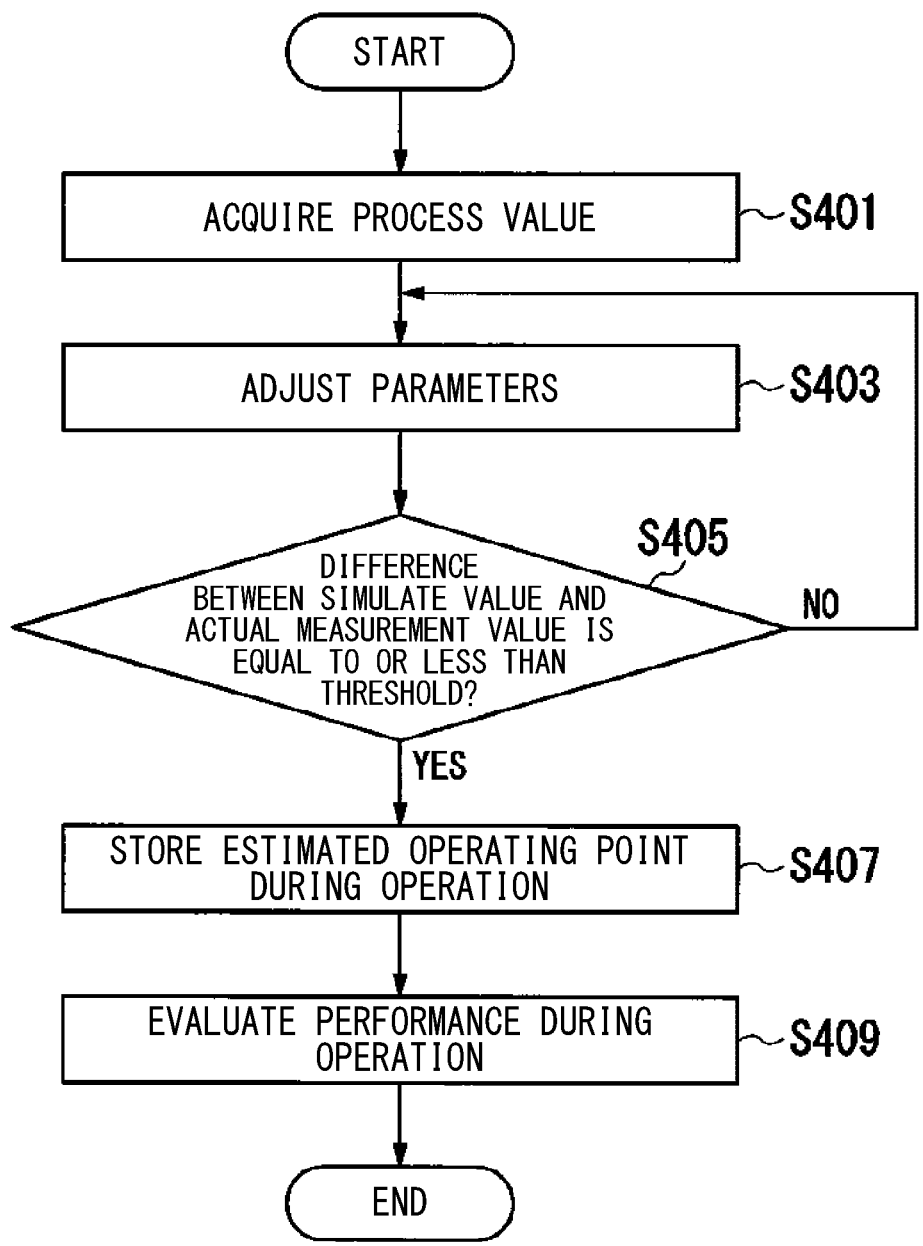
FIG. 9 is a flow chart showing one example of a performance evaluation process during operation of the evaluation apparatus in the present embodiment.

Next, the performance evaluation process during operation of the evaluation apparatus 3 in the present embodiment is described. FIG. 9 is a flow chart showing one example of the performance evaluation process during operation of the evaluation apparatus 3 in the present embodiment.

For example, at the evaluation starting time point of the target facility T during operation of the plant PL, the parameter adjustment unit 30 acquires, from the process value database 11, the suction pressure P1 and the discharge pressure P2 which are the process value used for the tracking simulation, and calculates the differential pressure between the suction pressure P1 and the discharge pressure P2 (Step S401). Note that the parameter adjustment unit 30 may also be set to calculate the ratio between the suction pressure P1 and the discharge pressure P2 instead of the differential pressure between the suction pressure P1 and the discharge pressure P2. In the followings, an example using the differential pressure between the suction pressure P1 and the discharge pressure P2 is described.

Next, the parameter adjustment unit 30 uses the calculated differential pressure between the suction pressure P1 and the discharge pressure P2 to adjust the rotation speed that is the parameter of the compressor C (Step S403). For example, the parameter adjustment unit 30 adjusts the rotation speed of the compressor C so that the simulate value, calculated by the tracking simulation, of the differential pressure between the suction pressure P1 and the discharge pressure P2 and the actual measurement value, acquired from the process value database 11, of the differential pressure between the suction pressure P1 and the discharge pressure P2 become equal to each other.

Next, the parameter adjustment unit 30 outputs, to the comparison unit 32, the simulate value of the differential pressure between the suction pressure P1 and the discharge pressure P2, and the actual measurement value, acquired from the process value database 11, of the differential pressure between the suction pressure P1 and the discharge pressure P2. The comparison unit 32 compares the simulate value with the actual measurement value, and outputs the comparison result to the parameter adjustment unit 30. The parameter adjustment unit 30 refers to this comparison result, and determines whether or not the difference between the simulate value and the actual measurement value is equal to or less than the predetermined threshold (Step S405). If the parameter adjustment unit 30 determines that the difference between the simulate value and the actual measurement value is not equal to or less than the predetermined threshold, the parameter adjustment unit 30 adjusts the rotation speed again. Note that the parameter adjustment unit 30 may also repeat the adjustment of the rotation speed until the simulate value and the actual measurement value are matched with each other.

On the other hand, if the parameter adjustment unit 30 determines that the difference between the simulate value and the actual measurement value is equal to or less than the predetermined threshold, the parameter adjustment unit 30 outputs the adjusted rotation speed to the operating point estimation unit 22 along with the process value at that time point, the time stamp, and the like. Note that the parameter adjustment unit 30 may also output other environmental conditions and the like to the operating point estimation unit 22. The operating point estimation unit 22 estimates the estimated operating point OP during operation associating the rotation speed, the process value, the time stamp, and the like with each other, which are input from the parameter adjustment unit 30, and stores the estimated operating point OP during operation in the storage unit 24 (Step S407). Note that the parameter adjustment unit 30 may also store the estimated operating point OP during operation in the storage unit 24.

Next, the evaluation unit 26 reads, from the storage unit 24, the reference estimated operating point RP created in the above-described reference performance evaluation process, and the estimated operating point OP during operation, and performs the performance evaluation during operation of the target facility T by comparing both of the reference estimated operating point RP and the estimated operating point OP during operation with each other (Step S409). The evaluation unit 26 may also display the evaluation result on the display unit 28. Also, the evaluation unit 26 may also calculate a deviation amount between the reference estimated operating point RP and the estimated operating point OP during operation without displaying the evaluation result on the screen, and if the deviation amount exceeds a preset threshold, the evaluation unit 26 may also notify a worker of this, for example. Note that the evaluation unit 26 may also read, in addition to the reference estimated operating point RP and the estimated operating point OP during operation, the value provided by the manufacturer MK from the storage unit 24, and perform the performance evaluation during operation of the target facility T by comparing these with each other. According to the above, the process of the present flow chart is completed.

Figure 10:
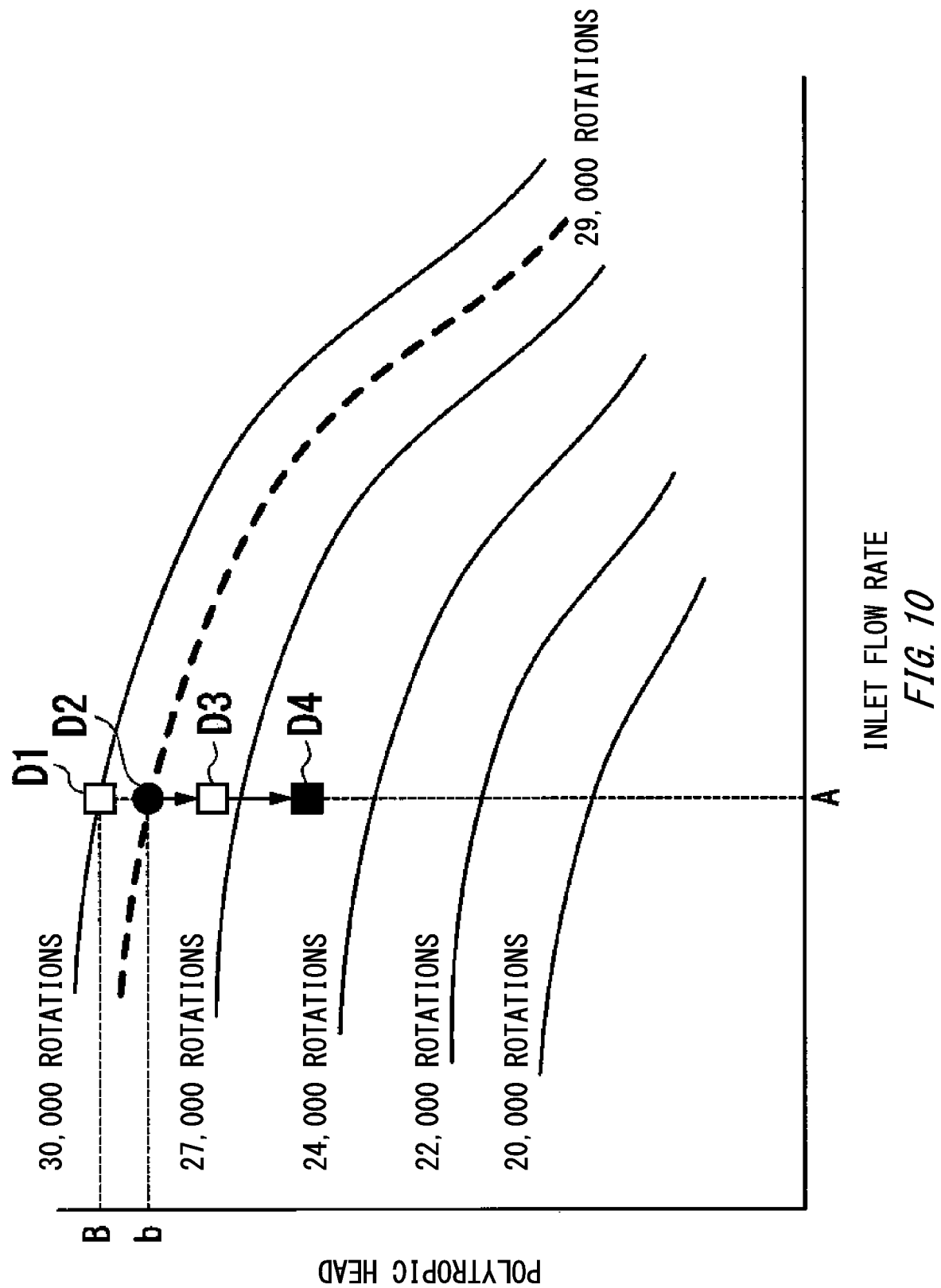
FIG. 10 is a drawing showing one example that the performance value during operation under the use condition in the actual plant is mapped on the performance curve of the value provided by the manufacturer in the present embodiment.

FIG. 10 is a drawing showing one example that the performance value during operation under the use condition in the actual plant PL is mapped on the performance curve of the value provided by the manufacturer MK in the present embodiment. In FIG. 10, it is shown that while the reference performance value under the use condition in the actual plant PL is D2, the performance value during operation is lowered to D3. Further, in FIG. 10, it is shown that at D4 that is temporally posterior to D3 (with the lapse of the operation time), the performance value during operation is further lowered. By displaying such an evaluation result, the deterioration status of the situation of the compressor C can be grasped.

According to the present embodiment described above, the operation state of the facility under the use condition in the actual plant can be evaluated with high accuracy, and the abnormality and the like of the facility can be early detected. According to the present embodiment, in particular, because the abnormality of the compressor can be detected in its sign stage, the abnormality of the facility can be detected earlier than the conventional method using a device such as a sensor. Also, for the compressor under the use condition in the actual plant, a difference from the value provided by the manufacturer can be grasped by obtaining the estimated operating point by the tracking simulator. By storing the above-described estimated operating point, appropriately implementing the tracking simulation under operation or during maintenance, and obtaining the estimated operating point at that time point, the change state (the deterioration status) of the situation of the compressor can be grasped (diagnosed).

The compressor incorporated into the plant is also often included in a plurality of control loops such as a surging prevention. In such a case, because if viewing from the whole system, a feedback loop works and it may look like that the operation is stable, it becomes difficult to grasp the change (such as the deterioration) of the compressor itself. According to the present embodiment, because the operating point of the compressor itself is focused, the change of the compressor included in the plurality of control loops can also be caught. Also, from the steep change of the estimated operating point, the change and the like of the fluid passing through the compressor (the change of the viscosity/material of the gas/liquid) can also be found.

Figure 11:
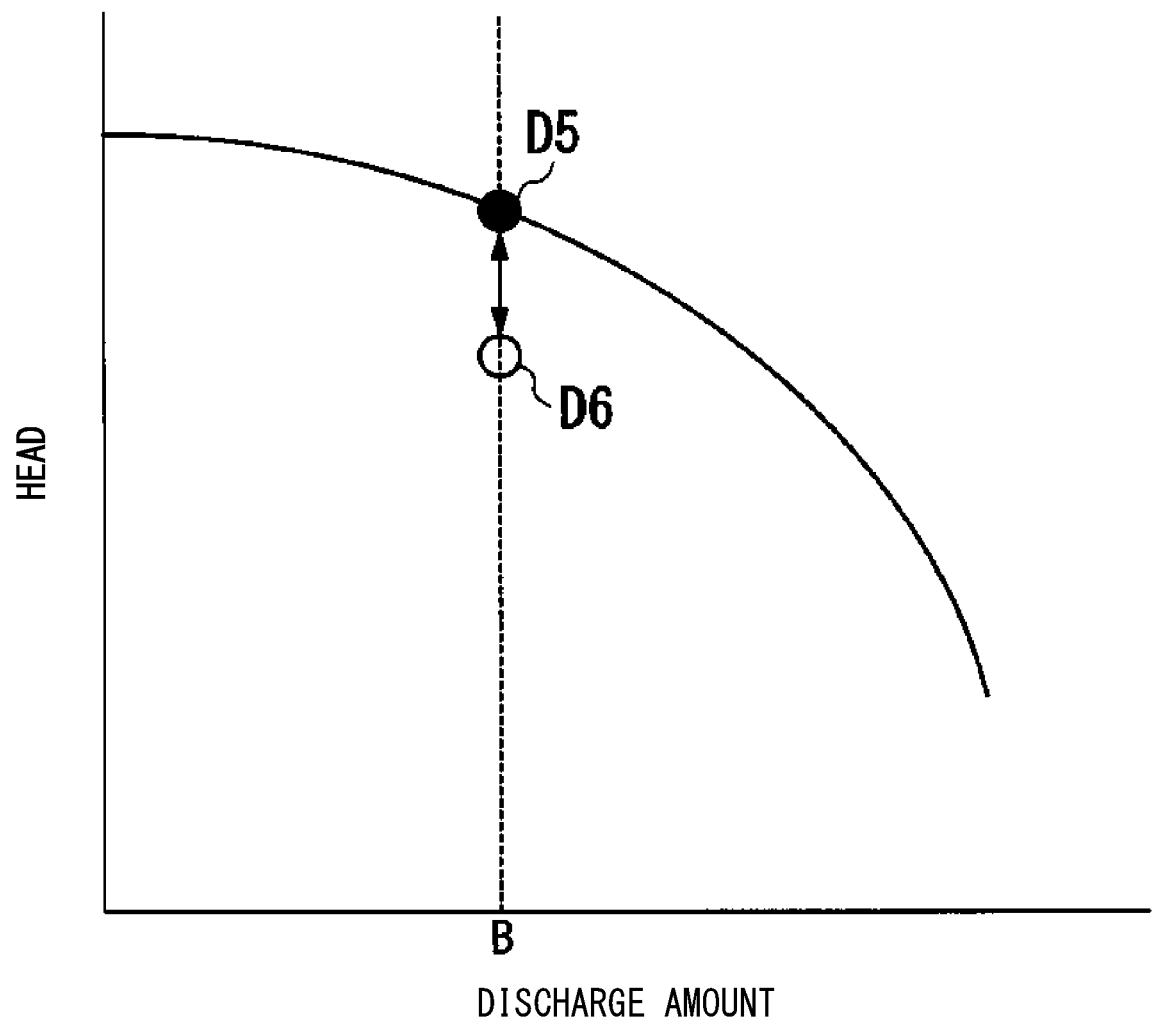
FIG. 11 is a drawing showing one example that the reference performance value under the use condition in the actual plant is mapped on a performance curve of the value provided by the manufacturer with respect to a head of a pump.

In the above-described embodiment, the example is described, in which the "differential pressure between the suction pressure P1 and the discharge pressure P2 or the ratio of the suction pressure P1 to the discharge pressure P2" is adopted as a calculation value of the measurement target in the "compressor" that is the evaluation facility T, and the "rotation speed" is adopted as the parameter of the adjustment target. In a case where a "pump" is to be evaluated as the evaluation facility T, the "differential pressure between the suction pressure and the discharge pressure or the ratio of the suction pressure to the discharge pressure" may be adopted as the calculation value of the measurement target, and a "head of the pump" may be adopted as the parameter of the adjustment target. FIG. 11 is a drawing showing one example that the reference performance value under the use condition in the actual plant PL is mapped on the performance curve of the value provided by the manufacturer related to the head of the pump. It is shown that while the value provided by the manufacturer of the head at the discharge amount B of the pump is D5, the reference performance value under the use condition in the actual plant PL is D6.

Also, in a case where a "heat exchanger" is to be evaluated as the evaluation facility T, an "outlet temperature" may be adopted as the process value of the measurement target, and an "overall heat transfer coefficient" may be adopted as the parameter of the adjustment target. Also, in a case where a "valve" is to be evaluated as the evaluation facility T, a "MV value" may be adopted as the process value of the measurement target, and a "CV value" may be adopted as the parameter of the adjustment target. In addition, for an "evaporator", a "reactor", and a "distillation tower", the present invention is also applicable by selecting and adjusting a model parameter having high sensitivity relative to the actual measurement value.

Also, although the configuration using the tracking simulator 20 is described in the above-described embodiment, an offline type simulator that adjusts the parameter offline may also be used.

Also, although the configuration using the tracking simulator 20 is described in the above-described embodiment, a simulator including both of a static simulator and a dynamic simulator, or a simulator including both of the static simulator and the tracking simulator may also be used.

The above-described static simulator is a simulator that uses a static model (a model that calculates a steady state of a plant or a process) to perform a simulation of a steady state of a device provided in the plant. Also, the above-described dynamic simulator is a simulator that uses a dynamic model (a model that calculates a dynamic behavior (a non-steady state) of the plant or the process) to calculate a transient state of the plant.

In a case where the tracking simulator 20 is used to adjust the parameter, external conditions of the plant (such as a production quantity, a raw material, and the like) may have changed. If these factors are included in the adjusted parameter value, the current parameter value and the past parameter value cannot be simply compared with each other in some cases. In the simulator including the above-described static simulator and dynamic simulator (or the above-described static simulator and tracking simulator), a comparison with the static model in the reference state is implemented by converting the dynamic model used in the tracking simulator into the static model and matching the condition (equalizing the operation condition). By utilizing this function, an error during the parameter adjustment according to the change of the external conditions of the plant can be reduced. Note that the detail of the simulator including such a static simulator and such a dynamic simulator (or such a static simulator and such a tracking simulator) has been disclosed in Japanese Patent Application No. 2016-021116.

According to the above present embodiment, the operation state of the facility under the use condition in the actual plant can be evaluated with high accuracy, and the abnormality and the like of the facility can be early detected. Note that an evaluation system of the above-described embodiment may be achieved by cloud computing, for example. Here, the cloud computing may also conform to, for example, the definition (the definition recommended by U. S. National Institute of Standards and Technology) described in the specified documents in the following URLs (Uniform Resource Locator).

http://nvlpubs.nist.gov/nistpubs/Legacy/SP/nistspecial-publication800-145.pdf;

https://www.ipa.go.jp/files/000025366.pdf

For example, it may also be set so that the process value of each facility in the plant is accumulated on a cloud connected to the plant via a network, and the evaluation of each facility is performed on this cloud.

Also, the above-described various processes of the present embodiment may also be performed by recording, in a computer-readable recording medium, a program for achieving the function of configuring the apparatus described in the above-described embodiment, and causing the program recorded in this recording medium to be read into and to be performed by a computer system. Note that the term "computer system" stated here may also include hardware such as OS or peripheral devices. Also, the term "computer system" may also include a home page providing environment (or a display environment) if a WWW system is utilized. Also, the term "computer-readable recording medium" refers to a storage apparatus such as a writable non-volatile memory, such as a flexible disk, a magneto-optical disk, a ROM, and a flash memory, a portable medium, such as a CD-ROM, and a hard disk built in a computer system.

Further, the term "computer-readable recording medium" includes a medium that carries a program for a certain time, such as a volatile memory (for example, DRAM (Dynamic Random Access Memory)) inside the computer system that is a server or client in a case where the program is sent via a network such as Internet, or a communication channel such as a telephone line. Also, the above-described program may also be transmitted, from the computer system storing this program in a storage apparatus and the like, to another computer system via a transmission medium or by a transmission wave in the transmission medium. Here, the term "transmission medium" that transmits the program means a medium that has a function of transmitting information, such as the network (communication network) such as Internet or the communication channel (communication line) such as the telephone line. Also, the above-described program may also be for achieving a part of the foregoing function. Further, the above-described program may also be to achieve the foregoing function by combining the program that has been recorded in the computer system, i. e., a difference file (a difference program).

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. An evaluation apparatus, comprising:
a processor;
a storage unit that is configured to use the processor to store a model modeling a state of a compressor provided in a plant, the model is expressed by a simultaneous equation indicating a relation among an input, an output, external factors and parameters of the compressor;
a simulator that is configured to use the processor to adjust a rotation speed of the compressor that is set in the model so that a difference between an actual measurement value based on a process value of the compressor in a first state and a first simulate value calculated by using the model is equal to or less than a threshold;
an estimation unit that is configured to use the processor to estimate a first estimated operating point that associates the adjusted rotation speed of the compressor, the process value, and a time of the first state to indicate an operation state of the compressor in the first state; and
an evaluation unit that is configured to use the processor to evaluate a change of an operation state of the compressor based on a difference between the first estimated operating point and a second estimated operating point, wherein
the simulator is configured to use the processor to adjust the rotation speed of the compressor so that a difference between an actual measurement value and a second simulate value calculated by using the model is equal to or less than the threshold, the actual measurement value based on a process value of the compressor in a second state that is temporally posterior to the first state,
the estimation unit is configured to use the processor to estimate the second estimated operating point that associates the adjusted rotation speed of the compressor, the process value, and a time of the second state to indicate an operation state of the compressor in the second state, and
the evaluation unit further is configured to use the processor to evaluate a performance of the compressor in the first state based on a difference between a performance value provided by a manufacturer of the compressor that indicates the performance of the compressor and data that indicates an estimated performance of the compressor at the first estimated operating point;
wherein, applying the model for a use condition, an abnormality during an actual operation of the compressor for the use condition can be detected without detecting the abnormality using a sensor.

2. The evaluation apparatus according to claim 1, wherein the first state indicates a state of the compressor during introduction of the compressor.

3. The evaluation apparatus according to claim 1, wherein the evaluation unit is configured to use the processor to evaluate a change of a fluid passing through the compressor based on the difference between the first estimated operating point and the second estimated operating point.

4. The evaluation apparatus according to claim 1, wherein the actual measurement value based on the process value of the compressor is a differential pressure between a suction pressure and a discharge pressure of the compressor, or a ratio of the suction pressure to the discharge pressure.

5. An evaluation system, comprising:
the evaluation apparatus according to claim 1;
a database that stores an operation condition of the compressor and the process value; and
a control system that is configured to use the processor to acquire the process value from the compressor and stores the process value in the database.

6. The evaluation apparatus according to claim 1, wherein the performance value provided by the manufacturer of the compressor is based on the manufacturer's experimental data.

7. The evaluation apparatus according to claim 1, wherein the performance value provided by the manufacturer of the compressor is provided prior to operation of the compressor.

8. An evaluation method, comprising:
adjusting a rotation speed of a compressor that is set in a model so that a difference between an actual measurement value based on a process value of a the compressor in a first state, the compressor provided in a plant, and a first simulate value calculated by using the model modeling a state of the compressor is equal to or less than a threshold; and
estimating a first estimated operating point that associates the adjusted rotation speed of the compressor, the process value, and a time of the first state to indicate an operation state of the compressor in the first state;
evaluating a change of an operation state of the compressor based on a difference between the first estimated operating point and a second estimated operating point; and
evaluating a performance of the compressor in the first state based on a difference between a performance value provided by a manufacturer of the compressor that indicates the performance of the compressor and data that indicates an estimated performance of the compressor at the first estimated operating point;
wherein
the adjusting includes adjusting the rotation speed of the compressor so that a difference between an actual measurement value and a second simulate value calculated by using the model is equal to or less than the threshold, the actual measurement value based on a process value of the compressor in a second state that is temporally posterior to the first state, and
the estimating includes estimating the second estimated operating point that associates the adjusted rotation speed of the compressor, the process value, and a time of the second state to indicate an operation state of the compressor in the second state;
wherein the model is expressed by a simultaneous equation indicating a relation among an input, an output, external factors and parameters of the compressor; and
wherein, applying the model for a use condition, an abnormality during an actual operation of the compressor for the use condition can be detected without detecting the abnormality using a sensor.

9. A non-transitory computer readable medium storing thereon a program for causing a computer to function as an evaluation apparatus by performing operations, comprising:
storing, by a storage unit, that stores a model modeling a state of a compressor provided in a plant, the model is expressed by a simultaneous equation indicating a relation among an input, an output, external factors and parameters of the compressor;
adjusting, by a simulator, a rotation speed of the compressor that is set in the model so that a difference between an actual measurement value based on a process value of the compressor in a first state and a first simulate value calculated by using the model is equal to or less than a threshold;
estimating, by an estimation unit, a first estimated operating point that associates the adjusted rotation speed of the compressor, the process value, and a time of the first state to indicate an operation state of the compressor in the first state;
evaluating, by an evaluation unit, a change of an operation state of the compressor based on a difference between the first estimated operating point and a second estimated operating point; and
evaluating, by the evaluation unit, a performance of the compressor in the first state based on a difference between a performance value provided by a manufacturer of the compressor that indicates the performance of the compressor and data that indicates an estimated performance of the compressor at the first estimated operating point;
wherein
the adjusting includes adjusting the rotation speed of the compressor so that a difference between an actual measurement value and a second simulate value calculated by using the model is equal to or less than the threshold the actual measurement value based on a process value of the compressor in a second state that is temporally posterior to the first state, and
the estimating includes estimating the second estimated operating point that associates the adjusted rotation speed of the compressor, the process value, and a time of the second state to indicate an operation state of the compressor in the second state;
wherein, applying the model for a use condition, an abnormality during an actual operation of the compressor for the use condition can be detected without detecting the abnormality using a sensor.

* * * * *